United States Patent
To et al.

(10) Patent No.: US 7,692,457 B2
(45) Date of Patent: Apr. 6, 2010

(54) DUAL-PATH CLOCKING ARCHITECTURE

(75) Inventors: Hing Y. To, Cupertino, CA (US); Roger K. Cheng, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 77 days.

(21) Appl. No.: 12/217,098

(22) Filed: Jun. 30, 2008

(65) Prior Publication Data

US 2009/0322398 A1    Dec. 31, 2009

(51) Int. Cl.
*H03L 7/00*    (2006.01)
(52) U.S. Cl. .................................. 327/144; 327/292
(58) Field of Classification Search ................. None
See application file for complete search history.

(56) References Cited

U.S. PATENT DOCUMENTS

| | | | | |
|---|---|---|---|---|
| 7,487,379 | B2* | 2/2009 | Nguyen et al. | 713/600 |
| 7,613,971 | B2* | 11/2009 | Asaka | 714/731 |
| 2007/0198882 | A1* | 8/2007 | Namura et al. | 714/726 |
| 2007/0286323 | A1* | 12/2007 | Shimobeppu | 375/376 |
| 2008/0005635 | A1* | 1/2008 | Kaibel et al. | 714/731 |
| 2008/0034246 | A1* | 2/2008 | Kelly | 713/500 |

* cited by examiner

*Primary Examiner*—Cassandra Cox
(74) *Attorney, Agent, or Firm*—Derek J. Reynolds

(57) ABSTRACT

A method and device are disclosed. In one embodiment the method includes driving a first clock domain reference signal on a first clock tree and driving a second clock domain reference signal on a second clock tree. The first tree routes the first signal from a PLL to a first clock domain drop off circuit and the second tree routes the second signal from the PLL to a second clock domain drop off circuit. A jitter produced from the second tree is less than a jitter produced from the first tree. The method continues by detecting any phase misalignment between the first signal and the second signal. The method also causes the first signal to be delayed so that it aligns with the second signal.

20 Claims, 3 Drawing Sheets

DUAL-PATH CLOCKING ARCHITECTURE

FIELD OF THE INVENTION

The invention relates to a dual-path clocking architecture for low power consumption.

BACKGROUND OF THE INVENTION

On-die clock trees, such as those that are integrated onto the die of an integrated circuit, consume a significant amount of power. Power consumption has become a very important concern in integrated circuit design considerations. Thus, saving power consumption on the clock tree is one area of that modern integrated circuit designs can benefit from.

Normally, a standard CMOS (complementary metal-oxide semiconductor) clock tree is extended out to a number of clock tree drop off points that each consist of the end of a branch of the tree. The tree is uniformly distributed with drivers (i.e. buffers) to drive the clock signal equally across the tree to all drop off points. Each driver introduces a certain amount of noise (i.e. jitter) into the clock signal. As the clock signal travels through more drivers in a deep clock tree, the jitter within the signal is increased.

The drivers are each supplied with a certain amount of power (i.e. a specific voltage level that causes them to consume a specific amount of power). For each driver, as the supplied power is increased, the gain of the driver is increased. As gain increases, signal jitter decreases. Thus, to compensate for the signal jitter introduced by the many drivers in a large clock tree, the power supplied to all of the drivers in the tree can be increased. Therefore, if a circuit requires a clock signal with little jitter, supplying the clock tree drivers with high power will help. Alternatively, if the circuit does not have strict requirements on the preciseness of the clock signal, the clock tree drivers may be supplied with less power, which would save on power consumption but would cause greater jitter in the clock signal.

Current clock trees are uniformly distributed to all drop off points, although this sometimes requires unnecessary power consumption because different circuitry beyond the different drop off points do not necessarily require the same level of precision (i.e. lack of jitter) of the clock signal.

Apart from CMOS drivers, there are other types of high-performance drivers that can be utilized in clock trees, such as common mode logic (CML) drivers. The performance of a driver is at least partially a function of the speed at which the driver can switch from outputting the clock signal at a low voltage to a high voltage and vice versa. The implementation of a clock tree balances a number of important factors. For example, a standard CMOS driver clock tree generally has a low cost associated with its implementation because CMOS drivers are simple and very standard circuits. The CMOS driver clock tree also generally consumes less power per driver than a high-performance clock tree. On the other hand, a CML (or other high-performance) driver clock tree generally introduces less jitter and less clock skew to the driven clock signal than a CMOS driver clock tree. Thus, tradeoffs exist when deciding whether to implement a lower or higher performance clock tree.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Figure 1:
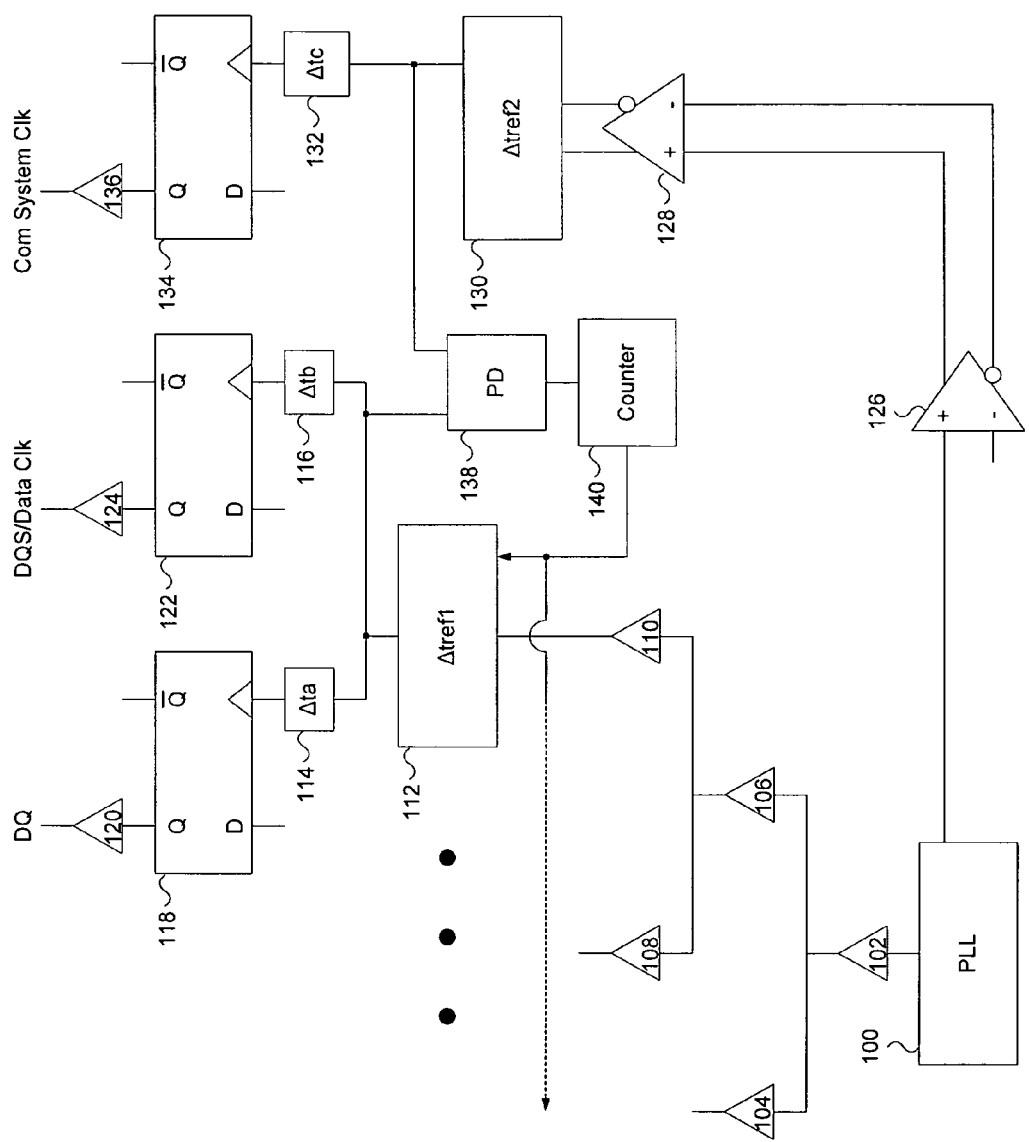
FIG. 1 describes an embodiment of a device and system providing a dual-path clocking architecture.

Embodiments of a method and device to provide a dual-path clocking architecture are disclosed. Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment.

In the following description and claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

In general, embodiments of a dual-path clocking architecture, including both a high-jitter clock tree and a low-jitter clock tree are disclosed. The high-jitter clock tree provides the source clock signal for one or more signal source circuits. A signal source circuit is a circuit that is the origination of a particular signal for transmission and use in a computer system. For example, the high-jitter clock tree may provide the source clock signal for a data signal (DQ) and a data strobe signal (DQS).

The high-jitter clock tree may use standard CMOS drivers in many embodiments. The high-jitter clock tree is so named because, in many embodiments, the drivers in the tree are provided with a low voltage, which causes each of the drivers to consume less power and, as a result, add jitter (i.e. noise) to the source clock signal. In general, a clock tree such as the high-jitter clock tree, which utilizes standard CMOS drivers and is powered at a low operational voltage, will cause the clock signal propagating through the tree to have significant jitter.

The maximum amount of jitter allowed within a clock signal may change depending on the specification requirements of the originating signal. For example, the DQ and DQS signals have a requirement to be edge aligned with each other. Even though there is high jitter in the clock signal provided to the source signal circuits of the DQ and DQS signals, this does not matter in this case because the DQ and DQS signals are source-synchronous. Thus, the DQ and DQS signals are edge aligned no matter the amount of jitter in the provided clock signal because of their source-synchronous nature. In another example, an originating signal that utilizes the clock signal but oscillates at ¹/₁₀₀th the speed of the clock signal may not care about clock signal jitter because the large granularity of the originating signal would mask any clock signal jitter. There are many signals that are produced without a required level of precision near or equal to the source clock signal.

On the other hand, there are some originating signals that do require high precision and are not source synchronous with other signals. These signals would require a low jitter in the source clock signal that is provided. Thus, in many embodiments, the low-jitter clock tree may provide the source clock signal for a common system clock (CSC) signal. The CSC signal may be propagated throughout the computer system to allow for timing and communication between devices within the system. In many embodiments, the CSC signal requires an accurate source clock signal with little jitter.

The terms "high-jitter" and "low-jitter" when referring to the respective clock trees are not absolute terms, rather they are relative to each other per driver. Thus, the high-jitter clock tree produces more jitter within the propagated signal per driver than does the low-jitter clock tree.

A combination of two variable parameters may be used to lower the jitter of the source clock signal transmitted over the low-jitter clock tree: the physical length of a path through the tree and the electrical length of the path through the tree. In some embodiments, the low-jitter clock tree may have a physically shorter length with fewer drivers required to propagate the source clock signal to a branch of the tree. For example, while the high-jitter clock tree may have 10 drivers through which to drive the source clock signal to reach the end of any given branch, the low-jitter clock tree may just have two drivers. Each driver that the source clock signal must pass through will add jitter to the source clock signal. Additionally, the longer the path is physically, the more jitter the signal incurs upon being propagated over the path. Thus, in some embodiments, a path through the low-jitter clock tree is physically shorter than a path through the high-jitter clock tree, which adds less jitter to the source clock signal. Also, in some embodiments, a path through the low-jitter clock tree includes fewer drivers than a path through the high-jitter clock tree.

Additionally, in some embodiments, a path through the low-jitter tree may be electrically shorter. An "electrically shorter" path through a clock tree refers to the quality of the drivers in the tree itself. The low-jitter clock tree may utilize common mode logic (CML) differential drivers or other such high gain drivers (as opposed to standard CMOS drivers in the high-jitter clock tree). Drivers such as CML drivers will make the low-jitter path electrically shorter because the signal is a low swing signal and is capable of switching from a high voltage to a low voltage (a "1" to a "0") and vice versa at a much faster speed. A low swing signal is a signal that requires less voltage change from the low voltage state to the high voltage state. For example, where a normal CMOS driver might have a voltage change from 0V to 1.4V and back to 0V, a low swing signal might have a voltage change from 0V to 0.7V and back to 0V. Also, CML drivers are more immune to power noise, which is noise introduced within a signal from the power driven into the driver. In other words, CML drivers and other high gain drivers provide better integrity output signals, which translates into less jitter. Thus, "electrically shorter" refers to the speed at which the source clock signal can switch from a high to a low and from a low to a high at a given driver on the tree. A detriment to the low-jitter clock tree is higher power consumption per driver on the tree as compared to a driver on the high-jitter clock tree. In other embodiments, the low-jitter clock tree utilizes high performance CMOS drivers, which also consume higher power than standard CMOS drivers.

This combination of high-jitter and low-jitter clock trees allows for lower total system power consumption due to the low power of the high-jitter clock tree. An issue with two separate clock trees is that the source clock signal propagated through each tree may create a source clock signal phase misalignment between the two trees.

Thus, a phase alignment circuit monitors the phase of each of the source clock signals propagated through the high-jitter clock tree and the low-jitter clock tree. Any phase misalignment, due to the separate nature the two clock trees is detected and corrected by adjusting the phase of one of the two respective source clock signals.

Alternatively, a third clock tree may be additionally implemented, which may be referred to as the host clock tree. The signal propagating through the host clock tree may be utilized as a reference clock signal used to align the edge of the signal transmitted through the high-jitter clock tree and align the edge of the signal transmitted through the low-jitter clock tree. Thus, when a host clock tree is utilized, the source clock signals propagated through the high and low-jitter clock trees are phase corrected to align with the host clock tree reference signal.

FIG. 1 describes an embodiment of a device and system providing a dual-path clocking architecture. In many embodiments, the clocking architecture circuitry shown in FIG. 1 is integrated within a memory controller in a computer system. The entire memory controller, as well as the general computer system, is not shown, though they may comprise any number of different types of memory controllers and computer systems in different embodiments. For example, the computer system may be a handheld device, a laptop computer, a desktop computer, a workstation computer, a server, a television set-top computer, a video game console, a computer integrated into an appliance or vehicle, or any other potential computer system in different embodiments. Also, the memory controller may be a discrete chip on a motherboard in the computer system or integrated into a processor in the computer system.

A phase locked loop (PLL) circuit 100 provides the source of a clock signal. The circuitry shown in FIG. 1 distributes the PLL clock source signal to a data signal (DQ), a data strobe signal (DQS), and a common source clock signal, though the PLL source clock signal may be distributed to one or more additional signals. In the embodiment shown in FIG. 1, the DQ signal, the DQS signal, and the common source clock signal are driven out to the memory subsystem, including specific system memory devices. In many embodiments, the DQ and DQS signals are driven directly to individual memory devices, whereas the common source clock signal is driven in a loop through all memory devices.

From the PLL, the source clock signal is transmitted across a high-jitter clock tree and a low-jitter clock tree. In the embodiment shown in FIG. 1, the high-jitter clock tree comprises a single-ended clock tree and the low-jitter clock tree comprises a differential clock tree. As discussed above, the source clock signal is propagated out across the high-jitter clock tree and the low-jitter clock tree from the PLL. Due to the disparity in either the physical length, the electrical length, or both the physical and electrical lengths of the high-jitter clock tree and the low-jitter clock tree, the source clock signal propagating through the high-jitter clock tree may have a unique and different phase from the source clock signal propagating through the low-jitter clock tree. Thus, the source clock signal propagating through the high-jitter clock tree may be referred to as the high-jitter clock domain reference signal and the source clock signal propagating through the low-jitter clock tree may be referred to as the low-jitter clock domain reference signal.

In many embodiments, the high-jitter clock tree includes a number of CMOS drivers (i.e. buffers), such as drivers 102-110. Each driver consumes a specific amount of power. In order to provide a uniform clock to every leaf of a given clock tree, each of the drivers requires being supplied by the same amount of power. The amount of power supplied to a given driver determines an amount of jitter in the driven clock signal. The greater the jitter within the clock signal, the less reliable the signal becomes. As more power is applied to the drivers in the tree, the jitter is reduced in the signal. Thus, a clock tree supplied with high power would produce a source clock signal with less jitter than a tree supplied with low power. The terms "high power" and "low power" are simply meant to be relative to each other.

The drivers in both clock trees drive the source clock signal from the PLL 100 to one or more drop off points. In many embodiments, a drop off point is a delay lock loop (DLL) circuit at an end of a branch of the clock tree to which the source clock signal is delivered. A DLL drop off point receives the source clock signal and performs any required phase correction to bring the source clock signal into phase. In many embodiments, the amount of phase correction of the signal is determined during testing of the computer system and can be set once at first power on.

In FIG. 1, Δtref1 112 is a DLL drop off point for the high-jitter clock tree. Δtref1 112 may be referred to as a high-jitter clock domain drop off circuit because it is a drop off point of the high-jitter clock tree. After any phase correction, the Δtref1 112 circuit pushes out a high-jitter clock domain output signal to all downstream circuitry that utilizes the clock. In many embodiments, after phase correction from a DLL drop off point, the signal pushed out from the drop off point circuitry may be referred to as the given clock domain's output signal (e.g. the Δtref1 112 drop off circuit pushes out the high-jitter clock domain output signal). The separately labeled "output signal" being output from the DLL is meant to distinguish from the "reference signal" being input into the DLL because, although both signals are a derivative of the source clock signal, their phases may not match if the DLL is required to perform phase alignment on the "reference signal" input.

In the case of the circuitry shown in FIG. 1, the Δtref1 112 circuit pushes out the high-jitter clock domain output signal to signal specific push outs Δta 114 and Δtb 116. In many embodiments, signal specific push outs may be phase interpolators that fine tune the phase of the clock signal. These push outs deliver the high-jitter clock domain output signal to data signal (DQ) driver circuitry and data strobe signal (DQS) driver circuitry, respectively. The DQ driver circuitry includes flop 118 and driver 120. This circuitry receives the clock signal from signal specific push out Δta 114 and drives the DQ signal. The DQS driver circuitry includes flop 122 and driver 124. This circuitry receives the clock signal from signal specific push out Δtb 116 and drives the DQS signal.

In many embodiments, each driver in the high-jitter clock tree is provided with a low voltage to provide a low but functional amount of power from a power supply in the computer system. In other words, the power supply is required to at least supply each driver with a minimum amount of power to maintain functionality of the driver. This minimum amount of power per driver is designed to save power consumption among the entire high-jitter clock tree. Though, as discussed, the low power increases the jitter of the source clock signal. In FIG. 1, the high jitter decays the quality of the driven DQ and DQS signals.

High jitter amongst the DQ and DQS signals will not cause edge alignment e problems due to the architectural layout of the DQ driver circuitry and DQS driver circuitry. The proximity of the circuitry between these two signals allows them to see a similar amount of power noise. The source synchronous nature of the DQ and DQS signals improves the timing margin even in a high jitter environment because when one signal displays jitter, the other signal also will display the same jitter.

A low-jitter clock domain source clock signal is also transmitted from the PLL across a low-jitter clock tree. In many embodiments, the low-jitter clock tree includes one or more high integrity drivers. In different embodiments, a high integrity driver may be a CML driver, a high-performance CMOS driver, or another driver that introduces a low amount of jitter to a source clock signal driven by the high integrity driver. In FIG. 1, high integrity drivers 126 and 128 comprise CML drivers in a differential clock tree. Drivers 126 and 128 drive the source clock signal to a single DLL drop off point, Δtref2 130. Δtref2 130 may be referred to as a low-jitter clock domain drop off circuit because it is the drop off point of the low-jitter clock tree.

The Δtref2 130 circuit pushes out the low-jitter clock domain output signal to signal specific push out Δtc 132. This push out, which may comprise a phase interpolator in some embodiments, delivers the clock signal to common system clock circuitry, which includes flop 134 and driver 136. This circuitry receives the clock signal from signal specific push out Δtc 132 and drives the common system clock signal.

Returning to the low-jitter clock tree, the tree is shown including two drivers, 126 and 128. Each of these two drivers consumes a specific amount of power, but because these are high integrity CML drivers, they consume a higher amount of power per driver than each of the drivers in the high-jitter clock tree (drivers 102-110). The high power consumption nature of the high integrity CML drivers maintains a low jitter for the source clock signal from the PLL. In other embodiments that are not shown in FIG. 1, the differential clock tree may utilize different types of drivers other than CML drivers such as high performance CMOS drivers. Although FIG. 1 shows the low-jitter clock tree as a differential clock tree, in other embodiments, the low-jitter clock tree may be a single-ended clock tree.

In many embodiments, the low-jitter clock tree that propagates the source clock signal from the PLL to Δtref2 130 is a physically shorter tree than the high-jitter tree that transmits a reference clock signal from the PLL to Δtref1 112. In other words, the physical distance between the PLL and Δtref2 130 is shorter than the physical distance between the PLL and Δtref1 112.

The nature of two separate clock trees creates a phase misalignment between the source clock signal transmitted on the high-jitter clock tree and the source clock signal transmitted on the low-jitter clock tree. Thus, in many embodiments, a phase alignment circuit including a phase detector (PD) 138 circuit and a counter 140 circuit is present to help in aligning the source clock signal pushed out from Δtref1 112 (i.e. the high-jitter clock domain output signal) and the source clock signal pushed out from Δtref2 130 (i.e. the low-jitter clock domain output signal).

The PD 138 is coupled to both the output of Δtref1 112 (i.e. the high-jitter clock domain output signal) and Δtref2 130 (i.e. the low-jitter clock domain output signal). The PD 138 compares the phases of the high-jitter clock domain output signal and the low-jitter clock domain output signal. In many embodiments, the phase of the high-jitter clock domain output signal is adjusted to align with the phase of the low-jitter clock domain output signal. The PD 138 detects the phase misalignment and communicates to the counter 140 to send an increase in delay or a decrease in delay to the DLL circuitry within Δtref1 112. In other embodiments that are not shown, the high-jitter clock domain output signal is utilized as the reference signal and the phase alignment circuitry adjusts the low-jitter clock domain output signal.

Figure 2:
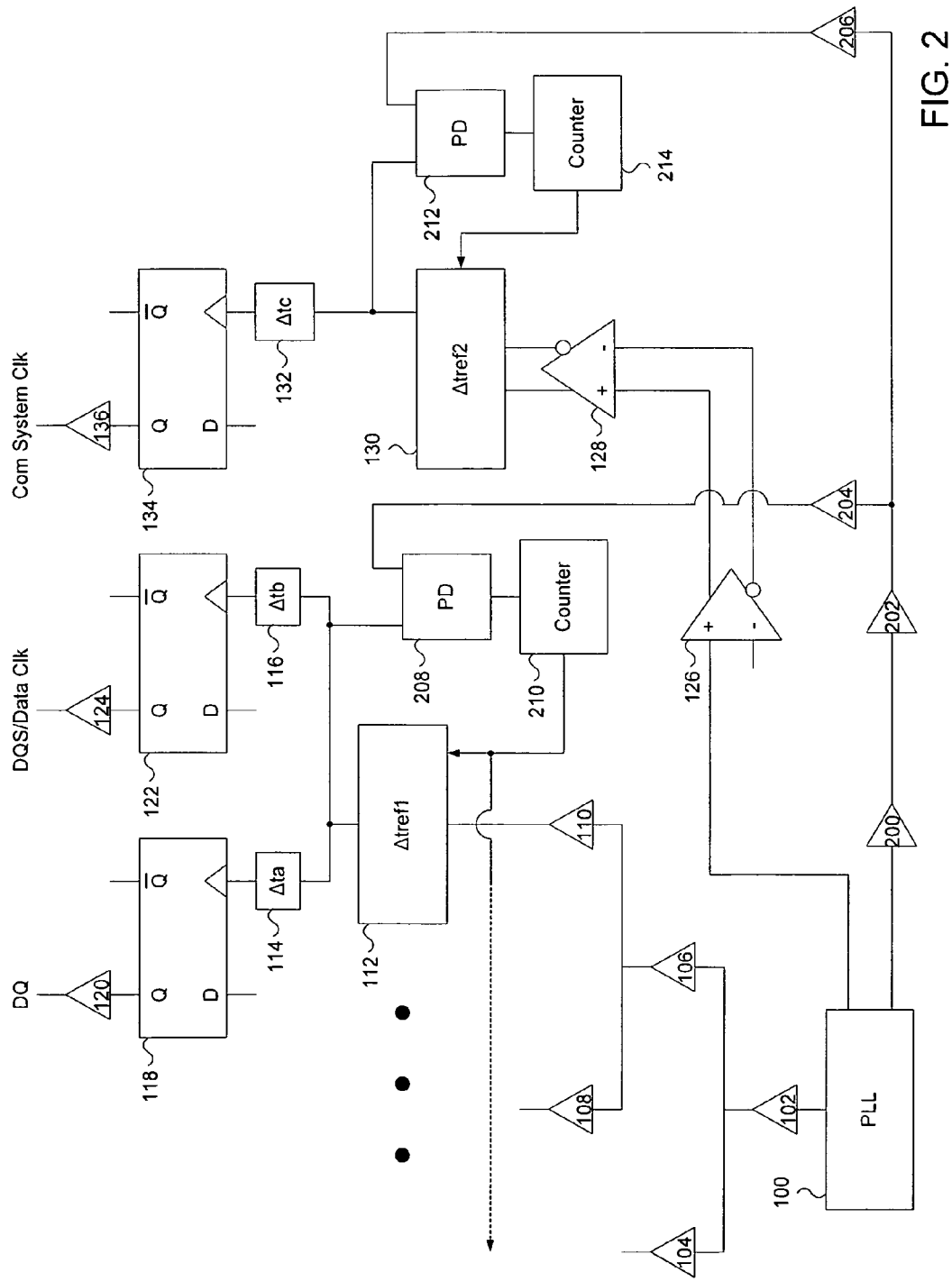
FIG. 2 describes another embodiment of a device and system providing a dual-path clocking architecture.

FIG. 2 describes another embodiment of a device and system providing a dual-path clocking architecture. The architectural layout of FIG. 2 has some of the same features that carry over from FIG. 1. Thus, the items in FIG. 2 that are labeled the same as in FIG. 1 can be read about in detail in regard to FIG. 1.

Instead of edge aligning the high jitter clock domain output signal coming out of Δtref1 112 directly with the low-jitter clock domain output signal coming out of Δtref2 130, a third clock tree transmitting a host clock domain reference signal from the PLL 100 is utilized as the main reference signal to align both the high-jitter clock domain output signal and the low-jitter clock domain output signal.

In many embodiments, the host clock tree includes several drivers, such as 200-206, to drive a host clock domain reference signal from the PLL directly to two phase detectors, PD 208 and PD 212. PD 208 is coupled to both the output of Δtref1 112 (i.e. the high-jitter clock domain output signal) and the host clock domain reference signal directly from the PLL 100.

The PD 208 compares the phases of the high-jitter clock domain output signal and the host clock domain reference signal. In many embodiments, the phase of the high-jitter clock domain output signal is adjusted to align with the phase of the host clock domain reference signal. The PD 208 detects the phase misalignment and communicates to the counter 210 to send an increase in delay or a decrease in delay to the DLL circuitry within Δtref1 112.

The PD 212 compares the phases of the low-jitter clock domain output signal and the host clock domain reference signal. In many embodiments, the phase of the low-jitter clock domain output signal is adjusted to align with the phase of the host clock domain reference signal. The PD 212 detects the phase misalignment and communicates to the counter 214 to send an increase in delay or a decrease in delay to the DLL circuitry within Δtref2 130.

Thus, in FIG. 2, both the high-jitter clock domain output signal and the low-jitter clock domain output signal are aligned with the host clock domain reference signal. This alignment will inherently align the high-jitter clock domain output signal and the low-jitter clock domain output signal with each other.

Figure 3:
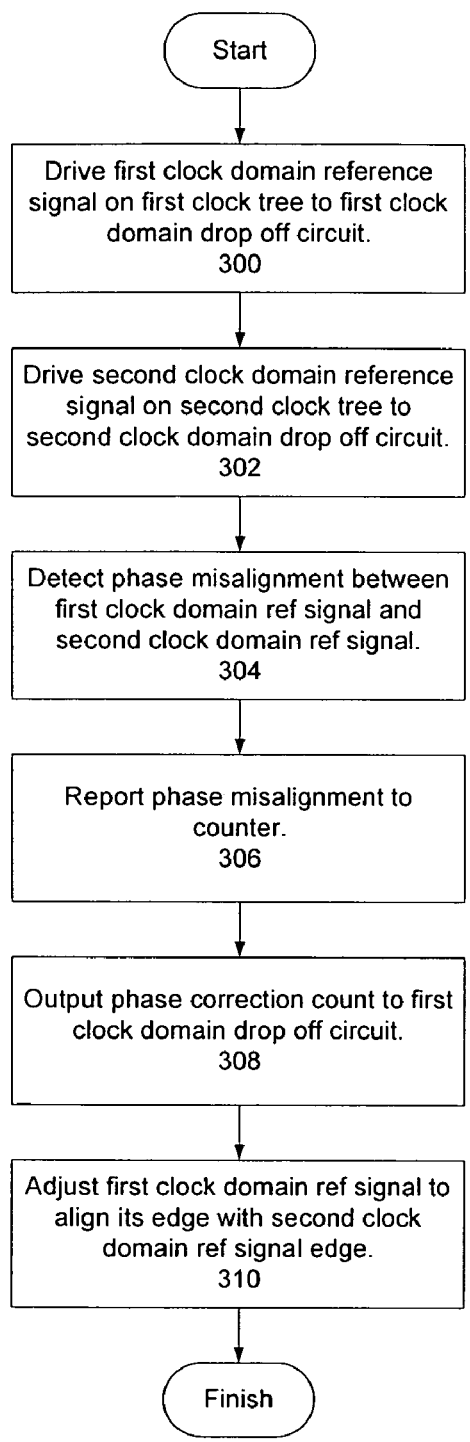
FIG. 3 is a flow diagram of an embodiment of a process to align a first clock signal from a first clock tree to a second clock signal from a second clock tree.

FIG. 3 is a flow diagram of an embodiment of a process to align a first clock signal from a first clock tree to a second clock signal from a second clock tree. The process is performed by processing logic that may comprise hardware logic, software logic, or a combination of both. Turning now to FIG. 3, the process begins by processing logic driving a first clock domain reference signal on a first clock tree to a first clock domain drop off circuit (processing block 300). The process continues with processing logic driving a second clock domain reference signal on a second clock tree to a second clock domain drop off circuit (processing block 302).

In many embodiments, the second clock tree is physically shorter, electrically shorter, or both physically and electrically shorter than the first clock tree. Additionally, in many embodiments, the first clock tree is powered in a low power state and the second clock tree is powered in a high power state (wherein the low power state and high power state are relative to each other), which allows the first clock tree to consume less power per driver within the first clock tree than the power per driver consumed within the second clock tree.

Next, processing logic detects any phase misalignment between the first clock domain reference signal and the second clock domain reference signal (processing block 304). Processing logic then reports the phase misalignment amount to a counter circuit (processing block 306). Processing logic within the counter circuit outputs a phase correction count value to the first clock domain drop off circuit (processing block 308).

Finally, processing logic within the first clock domain drop off circuit adjusts the first clock domain reference signal to align its edge with the second clock domain reference signal edge (processing block 310) and the process is finished.

Thus, embodiments of a method and device to provide a dual-path clocking architecture are disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
   driving a first clock domain signal on a first clock tree, using one or more drivers that produce a first jitter level within the first clock domain signal, from a phase locked loop (PLL) to a first clock domain drop off circuit;
   driving a second clock domain signal on a second clock tree, using one or more drivers that produce a second jitter level within the second clock domain signal, from the PLL to a second drop off point, wherein the second jitter level is smaller than the first jitter level;
   detecting any phase misalignment between the first clock domain signal transmitted from the first clock domain drop off circuit and the second clock domain signal transmitted from the second clock domain drop off circuit; and
   aligning the phases of the first clock domain signal and the second clock domain signal when a phase misalignment is detected.

2. The method of claim 1, further comprising:
   detecting phase misalignment, with a phase detector, between the first clock domain signal and the second clock domain signal;
   reporting the phase misalignment to a counter; and
   outputting a phase correction count, with the counter, to the first clock domain drop off circuit, wherein the phase correction count informs the first clock domain drop off circuit the amount of delay to modify the phase of the first clock domain signal to align with the second clock domain signal.

3. The method of claim 2, further comprising:
   supplying power to the one or more drivers that drive the first clock tree; and
   supplying power to the one or more drivers that drive the second clock tree, wherein the power supplied to each of the one or more drivers that drive the first clock tree is lower than the power supplied to each of the one or more drivers that drive the second clock tree.

4. The method of claim 1, wherein the first clock tree is a single-ended clock tree and the second clock tree is a differential clock tree.

5. The method of claim 1, wherein the first clock tree drivers include one or more CMOS (complementary metal-oxide semiconductor) drivers and the second clock tree drivers include one or more CML (current mode logic) drivers.

6. The method of claim 1, wherein the length of the second clock tree from the PLL to the second clock domain drop off point is physically shorter than the length of the first clock tree from the PLL to the first clock domain drop off point.

7. The method of claim 1, further comprising:
driving a host clock tree that transmits a host clock domain signal from the PLL to a first phase detector, the first phase detector detecting any phase misalignment between the first clock domain signal and the host clock domain signal; and
driving the host clock tree that transmits the host clock domain signal from the PLL to a second phase detector, the second phase detector detecting any phase misalignment between the second clock domain signal and the host clock domain signal.

8. The method of claim 7, further comprising:
delaying the second clock domain signal to align with the host clock domain signal when a phase misalignment between the second clock domain signal and the host clock domain signal is detected; and
delaying the first clock domain signal to align with the host clock domain signal instead of to align with the second clock domain signal when a phase misalignment between the first clock domain signal and the host clock domain signal is detected.

9. A device, comprising:
a first clock tree including one or more drivers, the first clock tree to transmit a first clock domain signal with a first jitter level from a phase locked loop (PLL) to a first clock domain drop off circuit;
a second clock tree including one or more drivers, the second clock tree to transmit a second clock domain signal with a second jitter level from the PLL to a second clock domain drop off circuit, wherein the second jitter level is smaller than the first jitter level;
a phase alignment circuit to
detect any phase misalignment between the first clock domain signal and the second clock domain signal; and
cause the first clock domain drop off circuit to align the first clock domain signal with the second clock domain signal when a phase misalignment is detected.

10. The device of claim 9, wherein the phase alignment circuit further comprises:
a phase detector to
detect a phase misalignment between the first clock domain signal and the second clock domain signal; and
report the phase misalignment to a counter; and
the counter to output a phase correction count to the first clock domain drop off circuit, wherein the phase correction count informs the first clock domain drop off circuit the amount of delay to add to the first clock domain signal to align with the second clock domain signal.

11. The device of claim 10, wherein the first clock domain drop off circuit further comprises:
a delay circuit to modify the phase of the first clock domain signal based on the phase correction count.

12. The device of claim 9, further comprising:
a power supply to supply power to the one or more drivers that drive the first clock tree and to supply power to the one or more drivers that drive the second clock tree, wherein the power supplied to each of the one or more drivers that drive the first clock tree that is lower than the power supplied to each of the one or more drivers that drive the second clock tree.

13. The device of claim 9, wherein the first clock tree drivers include one or more CMOS (complementary metal-oxide semiconductor) drivers and the second clock tree drivers include one or more CML (current mode logic) drivers.

14. The device of claim 9, wherein the length of the second clock tree from the PLL to the second clock domain drop off point is physically shorter than the length of the first clock tree from the PLL to the first clock domain drop off point.

15. A device, comprising:
a first clock tree including one or more drivers, the first clock tree to transmit a first clock domain signal with a first jitter level from a phase locked loop (PLL) to a first clock domain drop off circuit;
a second clock tree including one or more drivers, the second clock tree to transmit a second clock domain signal with a second jitter level from the PLL to a second clock domain drop off circuit coupled to a common system clock driver circuit, wherein the second jitter level is smaller than the first jitter level;
a host clock tree to transmit a host clock domain signal from the PLL to a first and a second phase alignment circuit;
the first phase alignment circuit to
detect any phase misalignment between the host clock domain signal and the first clock domain signal; and
cause the first clock domain drop off circuit to align the first clock domain signal with the host clock domain signal when a phase misalignment is detected by the first phase alignment circuit; and
the second phase alignment circuit to
detect any phase misalignment between the host clock domain signal and the second clock domain signal; and
cause the second clock domain drop off circuit to align the second clock domain signal with the host clock domain signal when a phase misalignment is detected by the second phase alignment circuit.

16. The device of claim 9, wherein the device further comprises:
a first phase detector to
detect a first phase misalignment between the first clock domain signal and the host clock domain signal; and
report the first phase misalignment to a first counter circuit;
the first counter circuit to output a first phase correction count to the first clock domain drop off circuit, wherein the first phase correction count informs the first clock domain drop off circuit an amount of delay to add to the first clock domain signal to align with host clock domain signal;
a second phase detector to
detect a second phase misalignment between the second clock domain signal and the host clock domain signal; and
report the second phase misalignment to a second counter circuit;
the second counter circuit to output a second phase correction count to the second clock domain drop off circuit, wherein the second phase correction count informs the second clock domain drop off circuit an amount of delay to add to the first clock domain signal to align with host clock domain signal.

17. The device of claim 16, wherein the first clock domain drop off circuit further comprises a delay circuit to modify the phase of the first clock domain signal based on the first phase correction count; and wherein the second clock domain drop off circuit further comprises a delay circuit to modify the phase of the second clock domain signal based on the second phase correction count.

18. The device of claim 15, further comprising:

a power supply to supply power to the one or more drivers that drive the first clock tree and to supply power to the one or more drivers that drive the second clock tree, wherein the power supplied to each of the one or more drivers that drive the first clock tree that is lower than the power supplied to each of the one or more drivers that drive the second clock tree.

19. The device of claim 15, wherein the first clock tree drivers include one or more CMOS (complementary metal-oxide semiconductor) drivers and the second clock tree drivers include one or more CML (current mode logic) drivers.

20. The device of claim 15, wherein the length of the second clock tree from the PLL to the second clock domain drop off point is physically shorter than the length of the first clock tree from the PLL to the first clock domain drop off point.

* * * * *